US011822345B2

(12) United States Patent
Matei et al.

(10) Patent No.: US 11,822,345 B2
(45) Date of Patent: Nov. 21, 2023

(54) CONTROLLING AN UNMANNED AERIAL VEHICLE BY RE-TRAINING A SUB-OPTIMAL CONTROLLER

(71) Applicant: Palo Alto Research Center Incorporated, Palo Alto, CA (US)

(72) Inventors: Ion Matei, Sunnyvale, CA (US); Rajinderjeet Singh Minhas, San Francisco, CA (US); Johan de Kleer, Los Altos, CA (US); Maksym Zhenirovskyy, Mountain View, CA (US)

(73) Assignee: XEROX CORPORATION, Norwalk, CT (US)

( * ) Notice: Subject to any disclaimer, the term of this patent is extended or adjusted under 35 U.S.C. 154(b) by 391 days.

(21) Appl. No.: 17/078,356

(22) Filed: Oct. 23, 2020

(65) Prior Publication Data

US 2022/0129012 A1    Apr. 28, 2022

(51) Int. Cl.
| | |
|---|---|
| *G05D 1/08* | (2006.01) |
| *G05B 13/04* | (2006.01) |
| *G06N 20/00* | (2019.01) |
| *B64C 39/02* | (2023.01) |
| *G05B 13/02* | (2006.01) |
| *B64U 101/00* | (2023.01) |

(52) U.S. Cl.
CPC ......... *G05D 1/0825* (2013.01); *B64C 39/024* (2013.01); *G05B 13/0265* (2013.01); *G05B 13/042* (2013.01); *G05B 13/048* (2013.01); *G05D 1/085* (2013.01); *G06N 20/00* (2019.01); *B64U 2101/00* (2023.01); *G05B 2219/13009* (2013.01)

(58) Field of Classification Search
None
See application file for complete search history.

(56) References Cited

U.S. PATENT DOCUMENTS

| 4,338,659 A | * | 7/1982 | Kurakake | ............ G05B 19/351 |
| | | | | 700/71 |
| 6,119,061 A | * | 9/2000 | Schenkel | ............. B62D 11/183 |
| | | | | 701/41 |
| 6,487,458 B1 | * | 11/2002 | Trapasso | ................ G05B 11/42 |
| | | | | 318/500 |

(Continued)

FOREIGN PATENT DOCUMENTS

WO    2020/032947    2/2020

OTHER PUBLICATIONS

Singh et al. 'Learning Stabilizable Nonlinear Dynamics with Contraction-Based Regularization', ArXiv 1907.13122 published by arXiv (2019).*

(Continued)

*Primary Examiner* — Bernard G Lindsay
(74) *Attorney, Agent, or Firm* — Mueting Raasch Group

(57) ABSTRACT

A nonlinear dynamic control system is defined by a set of equations that include a state vector and one or more control inputs. Via a machine learning method, a sub-optimal controller is derived that stabilizes the nonlinear dynamic control system at an equilibrium point. The sub-optimal controller is retrained to be used as a stabilizing controller for the nonlinear dynamic control system under general operating conditions.

18 Claims, 18 Drawing Sheets

(56) References Cited

U.S. PATENT DOCUMENTS

| | | | | |
|---|---|---|---|---|
| 6,532,454 B1* | 3/2003 | Werbos | ................... | G06N 20/00 |
| | | | | 706/14 |
| 2008/0048603 A1* | 2/2008 | Discenzo | .............. | H02P 29/032 |
| | | | | 318/609 |
| 2008/0086269 A1* | 4/2008 | Joe | ........................ | B60W 30/09 |
| | | | | 701/301 |
| 2015/0263603 A1* | 9/2015 | Pahlevaninezhad | ......................... | |
| | | | | H02M 1/4208 |
| | | | | 363/17 |
| 2016/0147201 A1* | 5/2016 | Crncich-Dewolf | ...... | G06N 3/08 |
| | | | | 700/47 |
| 2016/0341330 A1* | 11/2016 | Sneh | ...................... | G05D 7/0113 |
| 2017/0017212 A1* | 1/2017 | Collins | ................ | G05B 13/027 |
| 2017/0210470 A1* | 7/2017 | Pardell | ..................... | B08B 1/006 |
| 2018/0129974 A1 | 5/2018 | Giering et al. | | |
| 2018/0157933 A1* | 6/2018 | Brauer | ................... | G06V 10/82 |
| 2018/0194490 A1* | 7/2018 | Chen | ..................... | F16M 11/123 |
| 2018/0307231 A1* | 10/2018 | Sorton | ................... | G06N 5/025 |
| 2019/0093187 A1* | 3/2019 | Lee | .......................... | G01K 7/04 |
| 2019/0196892 A1* | 6/2019 | Matei | ...................... | G06N 5/003 |
| 2020/0089229 A1* | 3/2020 | Lee | ....................... | G05D 1/0212 |
| 2020/0285253 A1* | 9/2020 | Iwakura | ................. | G05D 1/105 |

OTHER PUBLICATIONS

Schuet et al. 'Stall Recovery Guidance Using Fast Model Predictive Control' AIAA SciTech Forum, Jan. 9-13, 2017, Grapevine, Texas, American Institute of Aeronautics and Astronautics, Guidance, Navigation, and Control Conference.*

Kingma et al., "ADAM: a Method for Stochastic Optimization", ICLR 2015, 2015, 15 pages.

* cited by examiner

CONTROLLING AN UNMANNED AERIAL VEHICLE BY RE-TRAINING A SUB-OPTIMAL CONTROLLER

SUMMARY

Embodiments described herein include a dynamic system control using deep machine learning. In one embodiment, a nonlinear dynamic control system is defined by a set of equations that include a state vector z and one or more control inputs u. Via a machine learning method, a sub-optimal controller is derived that stabilizes the nonlinear dynamic control system at an equilibrium point. The sub-optimal controller is retrained to be used as a stabilizing controller for the nonlinear dynamic control system under general operating conditions.

In another embodiment, a nonlinear dynamic control system is defined by a set of equations that include a state vector z and one or more control inputs u. Via a machine learning method, a sub-optimal controller is described that stabilizes the nonlinear dynamic control system at an equilibrium point. The sub-optimal controller is retrained to be used as a stabilizing controller for the nonlinear dynamic control system under general operating conditions. Retraining the sub-optimal controller involves a model predictive control (MPC) approach in which learning a parameterized, state-dependent control map is learned by solving a sequence of finite horizon optimal control problems.

In another embodiment, a controlled apparatus has a dynamic, closed-loop, stabilizing controller used to control a state of the controlled apparatus. A computer has a memory coupled to a processor. The memory includes instructions that cause the processor to: define a dynamic control system by a set of equations that include a state vector z of the controlled apparatus and one or more control inputs u of the controlled apparatus; via a machine learning method, derive a sub-optimal controller that stabilizes the controlled apparatus at an equilibrium point; retrain the sub-optimal controller to be used as the stabilizing controller for the controlled apparatus under general operating conditions; and facilitate transferring the stabilizing controller to the controlled apparatus. These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures. The drawings are not necessarily to scale.

DETAILED DESCRIPTION

Figure 1:
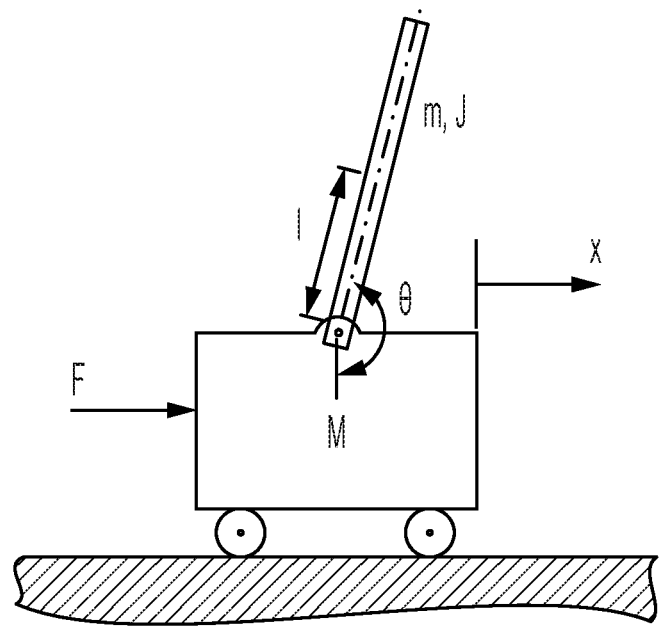
FIG. 1 is a block diagram of an inverse pendulum used to illustrate dynamic control according to an example embodiment.

The present disclosure relates to machine learning in control systems. Machine learning platforms, e.g., deep-neural networks, have become popular due to their successes in natural language processing and image processing. Increasingly, solutions based on deep learning algorithms have also made their way in many other applications. This disclosure demonstrates how deep learning platforms can be used for control systems. A deep learning platform may be trained to learn control policies, which can be challenging for some types of problems. The approaches described herein are different than reinforcement algorithms sometimes applied to control problems, although some challenges are common to both. To illustrate this approach, an example is shown to solve the stabilization of an inverted pendulum system at its unstable equilibrium point.

Embodiments described below illustrate how deep learning (DL) platforms can be used to learn control policies. The challenges and proposed approaches are described in some detail, as well as practical applications. The proliferation of DL algorithms is enabled by their ability to deal with large amount of data and by the success stories in natural language processing and image processing, with direct applications in autonomous vehicles control. Deep learning is based on large scale, first-order, gradient-based optimization algorithms. Many DL platform also feature automatic differentiation that leads to the ability to accurately evaluate loss functions gradients. More generally, there is a growing interest in "differentiable programming," a programming paradigm where programming constructs are enhanced with differential operators. In such a paradigm, the approach is to construct a causality graph describing the control flow and data structures of the program, and the application of the differential operators by backtracking on the causality graph. The graph can be static (TensorFlow) or dynamic (Pytorch, Autograd).

Section I

In this disclosure, automatic differentiation (AD) is used to learn control policies and Autograd is an example tool used for executing AD. The working example for illustrating the design of control policies is the stabilization of the inverted pendulum, a nonlinear system with an unstable equilibrium point. Gradient based optimization algorithms are used to learn parameterized, state dependent control maps (e.g., neural networks) that stabilize the pendulum at the unstable equilibrium point. The optimization algorithms train the controller parameters based on a state and control dependent loss function. Control inputs are learned explicitly by treating them as optimization variables. It can be shows that this process is non-trivial and that the choice of initial values of the controller parameters is key for the success of the learning process. Algorithms are proposed for deriving stabilizing, suboptimal controllers that we use as initial condition for the DL algorithms. This initial control policy by these sub-optimal controllers is improved by minimizing a loss function. DL platforms have already been successfully used for learning stabilizing controllers using reinforcement learning. As described below, many of the challenges found in reinforcement learning algorithms can also be found in these new approaches as well.

Notations: The vector or matrix norms are denoted by $\|\cdot\|$. Indices refer to a particular norm, when needed. A (closed) neighborhood of size c around a point $z_0$ is defined as $\mathcal{B}_\varepsilon(z_0)$ $\{z, \|z-z_0\| \leq \varepsilon\}$. The Jacobian of a vector valued function $f(x)$ is denoted by $\nabla f(x)$. The Jacobian becomes the gradient for a scalar valued function. For a function $f(x,y)$, $$\frac{\partial f(x,y)}{\partial x}$$

denotes its partial derivative with respect to x, evaluated at (x,y). The spectral radius of a matrix A is denoted by $\rho(A)$.

In the rest of this disclosure, Section II describes the problem setup and the working example. Section III shows the connection between the closed loop system and the stability of the learning algorithm. Section IV describes three approaches for solving optimal control problems, and how ideas and tools from machine learning can be instantiated in control problems. Section V provides additional examples.

Section II

Assume that a dynamical system is described by a possibly nonlinear ordinary differential equation (ODE) given by Equation (1) below, where z denotes the state vector, u represents the input signal, and w is a set of system parameters.

$$\dot{z} = f(z, u; w) \tag{1}$$

Without loss of generality, it may be assumed that z=0 is a, possibly unstable, equilibrium point. One objective is to learn control inputs that stabilize the state at the equilibrium point. State-dependent, parametric control schemes are considered (e.g., $u=g(z;\beta)$ where $\beta$ are the controller parameters) as well as non-parametric control schemes (e.g., control inputs are optimization variables). In addition, some state-dependent loss function $\mathcal{L}(z_0, u) = \int_0^T l(z_0, u) dt$, can be optimized for some time horizon T and some initial condition $z_0$. Control theory offers many options to approach this problem, including methods based on linearization, Lyapunov functions or model predictive control approaches. In this disclosure, DL models and platform features are used to learn control policies. Principles such as transfer learning can be used to ensure the stability of the learning process and reduce the time to compute an optimal solution. More formally, the goal is to solve an optimization problem of the form $\min_u \mathcal{L}(z_0; u)$.

Additional conditions can be imposed on u such as form (e.g., $u=g(z;\beta)$) or magnitude limitations (e.g., u belongs to some bounded set). In control theory, typical loss functions are quadratic in the state and the control input: $l(z;u) = \frac{1}{2}(z^T Q z + u^T R u)$ for some semi-positive matrices Q and R. If $f(z; u; w)$ is linear in the state and input, a quadratic regulator (LQR) optimal control problem is recovered.

For a working example, an inverted pendulum model is used, a diagram of which is shown in FIG. 1. The dynamics of the inverted pendulum are given by:

$$\dot{x} = v \tag{2}$$

$$\dot{v} = \frac{(J+ml^2)(bv - F - ml\omega^2\theta) - m^2l^2g\sin\theta\cos\theta}{(ml\cos\theta)^2 - (m+M)(J+ml^2)} \tag{3}$$

$$\dot{\theta} = \omega \tag{4}$$

$$\dot{\omega} = \frac{ml(F\cos\theta + ml\omega^2\sin\theta\cos\theta - bv\cos\theta + (m+M)\sin\theta)}{(ml\cos\theta)^2 - (m+M)(J+ml^2)} \tag{5}$$

where x and v are the cart's position and velocity, respectively, while $\theta$ and $\omega$ are the pole's angle and angular velocity, respectively. The symbol F denotes the force acting on the cart and plays the role of the input signal. The state vector is given by $z^T = [x; v; \theta; \omega]$. The remaining symbols represent parameters of the system and their values are listed in Table I, where M is the mass of the cart, m is the mass of the pendulum, g is the acceleration of gravity, J is the moment of inertia of the pendulum, and b is the coefficient of friction affecting the cart.

TABLE I

| M | m | l | g | J | b |
|---|---|---|---|---|---|
| 0.5 | 0.2 | 0.3 | 9.81 | 0.006 | 0.1 |

Note that in its original form, the dynamics of the inverted pendulum system are represented as a differential algebraic equation (DAE). We explicitly solved for the accelerations to generate the ODE form. It is not always possible to transform DAEs into ODEs. In such cases DL platforms (e.g., Pytorch or TensorFlow) cannot be used since they do not support DAE solvers. In that case, a platform is used that supports DAE solvers enhanced with sensitivity analysis capabilities such as DAETools, a Python package.

III. LEARNING DYNAMICS

Deep learning platforms require training data and first order gradient-based algorithms to learn model parameters. When learning control policies, one starts with a set of initial conditions of the system ODE, and the training data is generated online through model simulation, e.g., by solving an ODE for each iteration of the learning algorithm. For brevity, a continuous time version of the learning algorithm is used that can be readily discretized to obtain the familiar gradient descent algorithm. To minimize the chain rule application, when considering a state-dependent parameterized map, it is assumed that $g(z;\beta)$ has already been integrated in the loss function l, and vector field $f$, so that they only depend on z and $\beta$. The continuous dynamics of the gradient descent algorithm are given by Equation (6a) below. The partial derivative of the loss function can be explicitly written as in Equation (6b).

$$\dot{\beta} = \nabla_\beta \mathcal{L}(\beta), \beta(0) = \beta_0 \quad (6a)$$

$$\nabla_\beta \mathcal{L}(\beta)^T = \int_0^T \left( \frac{\partial l}{\partial z} \frac{\partial z}{\partial \beta} + \frac{\partial l}{\partial \beta} \right) dt \quad (6b)$$

For notational brevity let $$z_\beta = \frac{\partial z}{\partial \beta},$$

which represents me sensitivity of the state vector with respect to the controller parameters. The sensitivity $z_\beta$ has its own dynamics, and is given by:

$$\dot{z}_\beta = \frac{\partial f(z)}{\partial z} z_\beta + \frac{\partial f(z)}{\partial \beta}, z_{\beta_0} = 0 \quad (7)$$

A first observation is that Equation (7) is identical to the linearized system dynamics around the equilibrium point, up to the initial conditions. More importantly, such linearization enables the stability analysis of the closed loop system around the equilibrium point. In particular, as is well established in control theory, the spectral properties of $$\frac{\partial f(0)}{\partial z}$$

determine the behavior of the system near the equilibrium point. We summarize this result in the following proposition.

Proposition 3.1: Assume that the real parts of eigenvalues of the matrix $$\frac{\partial f(0)}{\partial z}$$

are negative. Then, there exists a scalar $\varepsilon>0$ such that $$\lim_{t \to \infty} \|z(t)\| = 0, \forall t \geq 0, \forall z_0 \in \mathcal{B}_\varepsilon(z_0).$$

The proposition above provides the means to test, at least locally, the stabilizing properties of control maps. The main message here is that the stability of the sensitivity vector $z_\beta$ is directly related to the (local) stability of the closed loop system. More importantly, an unstable sensitivity vector will induce instability in the gradient of the loss function. As a result, unless the gradient descent is able to update the parameters $\beta$ fast enough such that the closed loop system becomes stable, the gradients of the loss function will grow unbounded leading to the instability of the parameter learning algorithm itself.

Since gradient based algorithms are first order algorithms, they typically have a slow convergence rate. Hence, unless the initial controller parameters are such that they induce a stable closed loop system, the learning algorithm will very likely fail. An experiment was performed with respect to the stability properties of the initial controller parameters. A linear map was considered for the controller since it has only four parameters. We drew 105 controller parameters from the interval [−10; 10]. Out of $10^5$ parameter choices, only 18 controllers were stabilizing near the equilibrium point. This suggests an extremely high probability (0.99982 in this case) of starting with an unstable controller.

The situation becomes even worse when considering more complex controller maps, e.g., neural networks, whose number of parameters is considerably larger. Therefore, a strategy is needed that will avoid the failure of the learning algorithm. In what follows, two such strategies are proposed that have a transfer learning interpretation. The first strategy is based on first learning an initial controller that is guaranteed to stabilize the closed loop, at least near the equilibrium point.

The second strategy is based on a sequence of learning problems which start with a short enough time horizon to avoid gradient blow-up, and then keep increasing the time horizon until the model converges to a stable controller.

Regarding the stability of the loss function gradients, it is useful to formally show why stability of the closed loop system matters for learning a controller. Consider the linear dynamics $z(t+1) = Az(t) + bu(t)$ with $A \in \mathbb{R}^{n \times n}$, $b \in \mathbb{R}^n$ and a linear controller parameterization $u(t) = \beta^T z(t)$. One goal is to find a stabilizing controller that minimizes the quadratic loss function $$\mathcal{L}(\beta) = \frac{1}{2N} \sum_{t=1}^N z(t)^T z(t).$$

We use a first order, gradient based optimization algorithm given by $\beta_{k+1} = \beta_k - \alpha_k \Box \mathcal{L}(\beta_k)$, where $\alpha k$ is the iteration step-size. The next result shows that a stable initial controller ensures bounded loss function gradients.

Proposition 3.2: Let $u(t) = b\beta_0$ be a stabilizing controller, where $\beta_0$ is the initial value for the vector of optimization variables $\beta$. Then there exists a sequence $\{\alpha_k\}_{k \geq 0}$ and a large enough N such that $\|\nabla \mathcal{L}(\beta_k)\|$ is bounded for all k.

Proof: The gradient of the loss function can be explicitly written as $$\nabla \mathcal{L}(\beta)^T = \frac{1}{N} \sum_{t=1}^N z(t)^T z_\beta(t)$$

where $$z(t) = (A + b\beta^T)^k z(0)$$

and $$z_\beta(t+1) = (A + b\beta^T) z_\beta(t) + z(t) b^T.$$

In particular, recalling that $z_\beta(0) = 0$, this leads to $$z_\beta(t) = \sum_{t=0}^{t-1} (A + b\beta^T)^i z(t-1-i) b^T$$

$$= \sum_{t=0}^{t-1} (A + b\beta^T)^i (A + b\beta^T)^{t-1-i} i b^T$$

$$= t(A + b\beta^T)^{t-1} b^T$$

The loss function gradient can now be expressed as $$\nabla \mathcal{L}(\beta)^T = \frac{1}{N} z(0)^T \sum_{t=1}^N \left[ (A + b\beta^T)^T \right]^t t(A + b\beta^T)^{t-1} b^T.$$

Assuming that $u(t)=b\beta_k$ is a stabilizing controller, this results in $\nabla \mathcal{L}(\beta_k)$ being bounded since for large enough N the exponential decay of $(A+b\beta^T)^t$ dominates the linear increase of t. There should exist $\alpha k$ such that $\rho(A+b\beta_k^T)<1$. Let $c_k=\nabla \mathcal{L}(\beta_k)$ be the gradient vector at iteration k. Then the stability of $z_{\beta_{k+1}}$ is determined by the transition matrix $A+b\beta_{k+1}^T=A+b\beta_k^T+\alpha_k bc_k^T=A+b\beta_k^T+M_k$. Since $\rho(A+b\beta_k^T)<1$, there exists a positive constant $\eta_k$ that depends on $\beta_k$ and $\alpha_k$ such that $\|M_k\|\leq\eta_k$. In addition, there exists also $\gamma_k>0$ and $0<\lambda<1$, such that $\|(A+b\beta T\ k)t\|\leq\gamma k\lambda tk$, for all $t\geq 0$. Using a perturbation theory argument (e.g., similar to the one in Wilson J. Rugh, *Linear system theory*. Prentice Hall, Upper Saddle River, N.J., 2nd ed. edition, 1996, Theorem 24.7, page 455), it can be shown that the state vector when using $u(k)=b\beta_k^T$ satisfies $\|z(t)\|\leq\gamma_k(\lambda_k+\gamma_k\eta_k)^t\|z(0)\|$. But since $\lambda_k<1$, we can choose $\alpha k$ small enough such that $\eta_k$ becomes small enough for the inequality $\lambda_k+\gamma_k\eta_k<1$ to be satisfied. This, in turn, ensures that $\rho(A+b\beta_k^T)<1$, which concludes the proof.

Remark 3.1: The theoretical bound on the step-size $\alpha k$ that ensures closed loop stability is $$\alpha_k < \frac{1-\lambda_k}{\gamma_k\|bc_k^T\|}.$$

This bound should be compared with the bound that ensures the convergence of the gradient descent algorithm and the minimum between the two bounds should be chosen.

Remark 3.2: The previous result was proven for a linear system and quadratic cost function. Since near the equilibrium point the behavior of a nonlinear system can be approximated with a linear system, the result can be applied to nonlinear systems, provided the initial condition of the state vector is close enough to the equilibrium point.

IV. LEARNING ALGORITHMS FOR CONTROL

In this section three approaches are presented for learning a stabilizing controller. All approaches use concepts related to transfer learning methods used in deep learning. Such methods proved to be effective tools in image classification applications to reduce the training time and training data requirements. The main idea behind transfer learning is to use a "favorable" initial condition for the training algorithm, taken from a previously trained model, and to re-train the entire model (or only a part of it).

In the first approach, a parameterized map is learned for a stabilizing controller that minimizes a quadratic loss function. The initial values of the map parameters are chosen by separately training a controller that stabilizes the linear approximation of the nonlinear dynamics around the equilibrium point. In the second approach, a stabilizing controller is again learned for the linearized dynamics, but this time the non-parameterized control inputs are used as initial conditions to solve a finite horizon optimal control problem that explicitly generates optimal control inputs. In the third approach, a parameterized, state dependent control map by solving a sequence of optimal control problems whose time horizons are sequentially increased.

For all three approaches, Autograd and Python were used to automatically compute gradients used for learning the control policies. The optimization algorithms already available in Python packages (e.g., SciPy) were used to ensure compatibility with Autograd. While these computational tools are generally not appropriate for real time applications, they do provide insights into the behaviors and challenges of the approaches.

A. Learning a State-Dependent Control Parameterization with a Stabilizing Initial Controller Learning a stabilizing initial controller is based on manipulating the spectral properties of the Jacobian off $(z;\beta)$ at the equilibrium point such that we ensure the existence of an attractor around the equilibrium point. Recall that one of the approaches for finding a stabilizing controller is to locally linearize in terms of the state z and control input u in order to obtain a linear ODE $\dot{z}=Az+Bu$. Under a controllability assumption that ensures the existence of a stabilizing linear controller, a simple pole placement approach will find a linear control $u=Kz$. In this case, no linear constraint is imposed on the controller since the objective is to cover a richer class of control maps.

Proposition 3.1 connected the local stability properties of the closed loop system to the spectral properties of the Jacobian $$\frac{\partial f(0;\beta)}{\partial z}.$$

A feature of DL platforms is the ability to automatically differentiate loss functions. By using this feature, a function can be generated that can be repeatedly evaluated at any state and control parameters pair $(z;\beta)$. More importantly, it can be applied to high dimensional vector fields $f(z;\beta)$. It is more convenient to look at the discrete time version of $$A(\beta) = \frac{\partial f(0;\beta)}{\partial z}.$$

For a small enough time step h, the discrete version of $A(\beta)$ is given by $$A_d(\beta) = I + \frac{1}{1!}hA(\beta) + \frac{1}{2!}h^2A(\beta)^2 + \ldots.$$

Since the matrix multiplication operations are efficiently executed on DL platforms, we enough terms of the Taylor series expansion can be kept to ensure a good approximation of the matrix exponential. The stability of the closed loop system can now be expressed in terms of the spectral radius $\rho(A_d;\beta)$, which is the largest of the absolute values of the eigenvalues of $A_d(\beta)$. The closed loop system is stable if and only if $\rho(A_d;\beta)<1$. A useful inequality for this purpose is: $\rho(A_d;\beta)^k\leq\|A_d(\beta)^k\|$ all $k\geq 1$ and for all consistent norms. Hence it is sufficient to impose that $\|A_d(\beta)^k\|$ converges to zero at an exponential rate to ensure the closed loop stability. To learn the controller parameters $\beta$, we solve the optimization problem below:

$$\min_\beta \max\{0,\|A_d(\beta)^k\|-\lambda^k\}, \quad (8)$$

for some large enough $k\geq 1$, and some positive real scalar $\lambda<1$. Note that if starting with a large k and the initial values of $\beta$ are such that $\rho(Ad;\beta)>1$, computing the matrix powers will quickly lead to a numerical overflow. To avoid this situation, a sequence of the optimization problems of type in Equation (8) are solved starting with a small k, and continually increase k until no further improvement is observed. Note that it is not necessary to use the "max" operator in the cost function—its primary purpose is to stop the optimization when a feasible solution is reached. The process for learning stabilizing initial controller parameters is summarized in Algorithm 1.

---

Algorithm 1: Algorithm for learning stabilizing initial control parameters based on Jacobian spectral properties

---

1: Input data: vector field map f(z;β), discretization step h, set of increasing indices K = {k$_1$; k$_2$; ..., k$_N$}, initial values for the controller parameters β

2: Use auto-differentiation to generate the Jacobian map $\dfrac{\partial f(0;\beta)}{\partial z}$ 3: Compute the discrete matrix
$$A_d(\beta; h) = I + \frac{1}{1!}hA(\beta) + \frac{1}{2!}h^2 A(\beta)^2 + \ldots$$

4: for k in K do
5:    β ← arg min$_\beta$ {0,‖A$_d$(β)$^k$‖ − λ$^k$}
6: Return β

---

Algorithm 1 was applied to the inverted pendulum example where the controller was mapped as a neural network with one hidden layer of size 20. The bias vector was set to zero. Hence there were a total of 104 parameters. The initial values of the entries of β were drawn uniformly from the interval [0; 0:1], and the time step size was chosen as h=0:01. The discrete matrix A$_d$(β) was computed using 5 terms in the Taylor series expansion.

Figure 2:
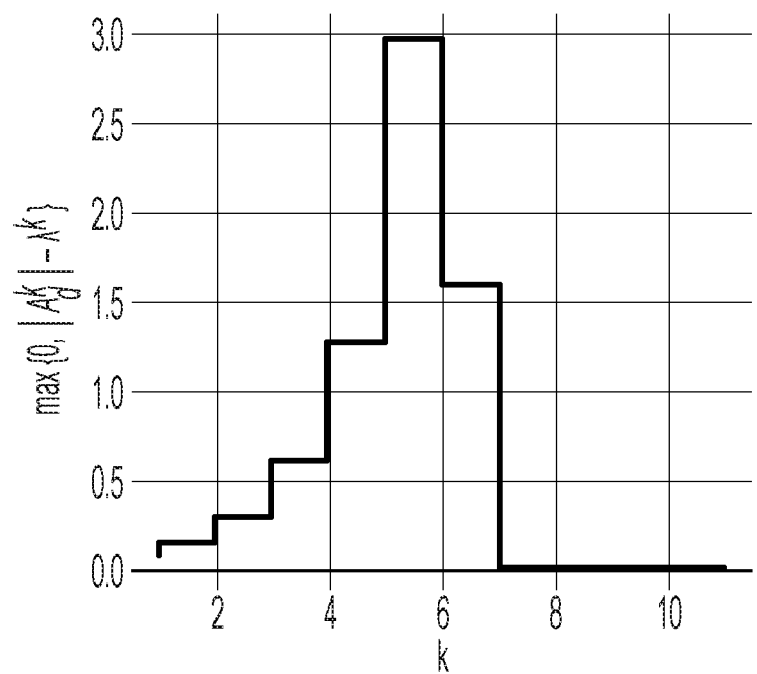
FIG. 2 is a graph showing loss function evolution when learning a stabilizing controller according to an example embodiment.

Equation (8) was solved for k∈{1, 2, ..., 11} using what is hereinafter referred to as the Adams algorithm described in Diederik P. Kingma and Jimmy Ba. Adam, *A method for stochastic optimization*, 2014 (Published as a conference paper at the 3rd International Conference for Learning Representations, San Diego, 2015). In this case, for the solution of Equation (8), each problem was allotted 2000 iterations and a step size of 0:001. The imposed decay rate was chosen as λ=0.999. The results produced by Algorithm 1 are shown in FIG. 2, which is a graph of loss function max{0,‖A$_d$(β$^k$‖−λ$^k$} evolution as a function of the k. Each optimization problem was limited to 2000 iteration with a step-size 10$^{-3}$. Note that for k≥8 the parameterized control map is stabilizing. Also note an increase in the loss at the first iteration. This is expected, especially for matrices with complex eigenvalues. In fact, there exists some positive scalar c such that ‖A$_d$(β)$^k$‖≤cλ$^k$. This scalar was neglected here, since for large enough k, its effect can be ignored.

Figure 3A:
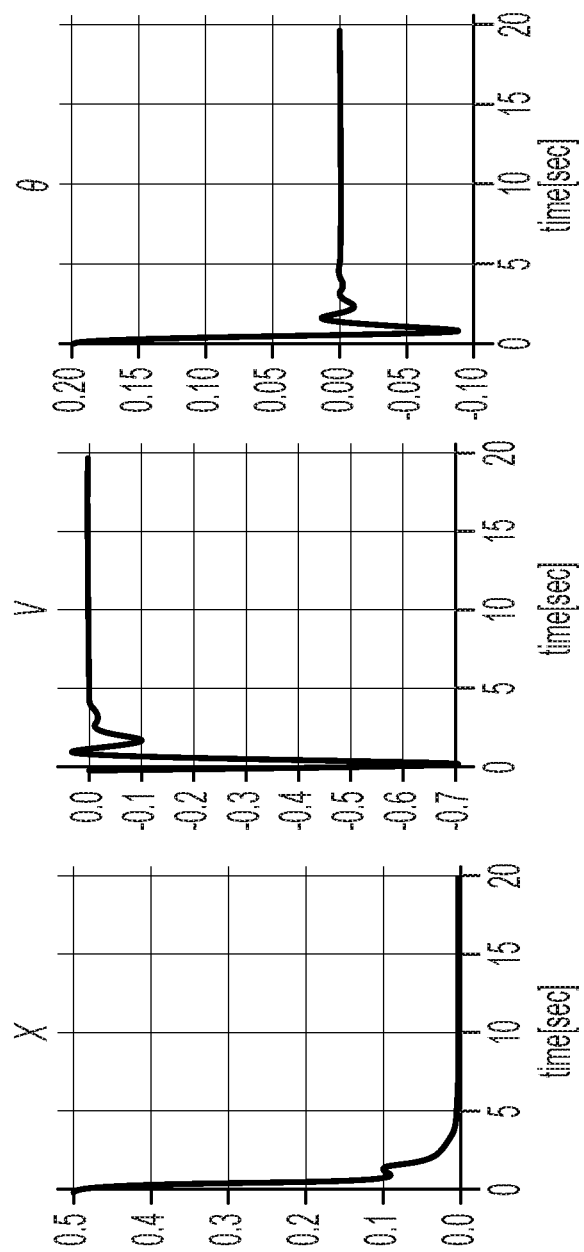
FIGS. 3A and 3B are graphs showing the behavior of a suboptimal stabilizing controller according to an example embodiment.
Figure 3B:
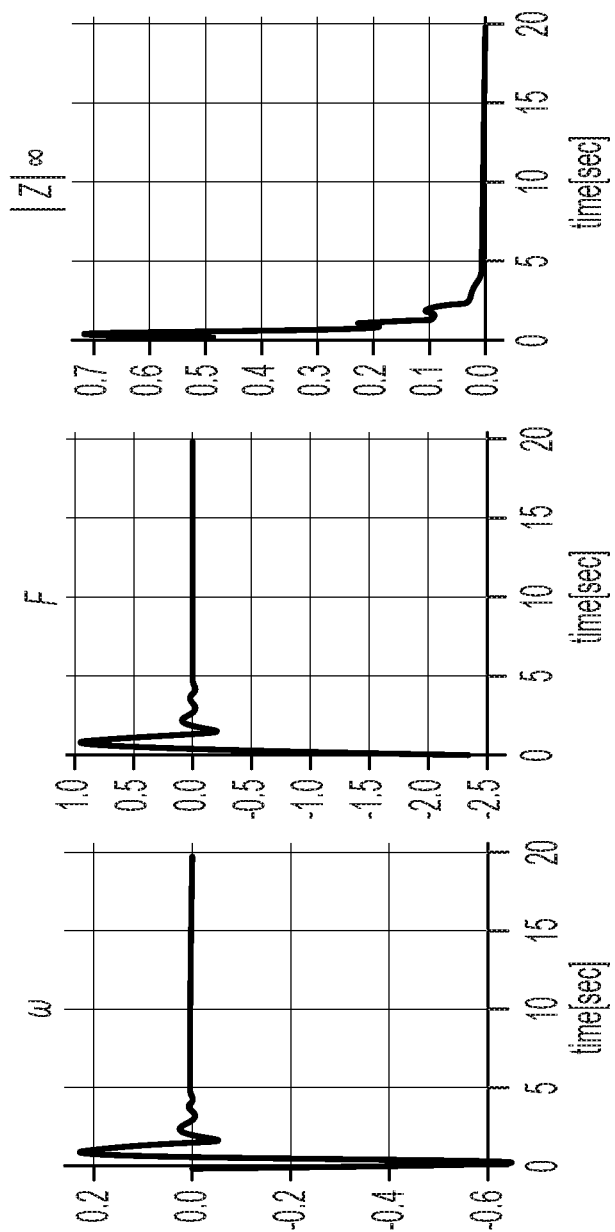
Figure 4:
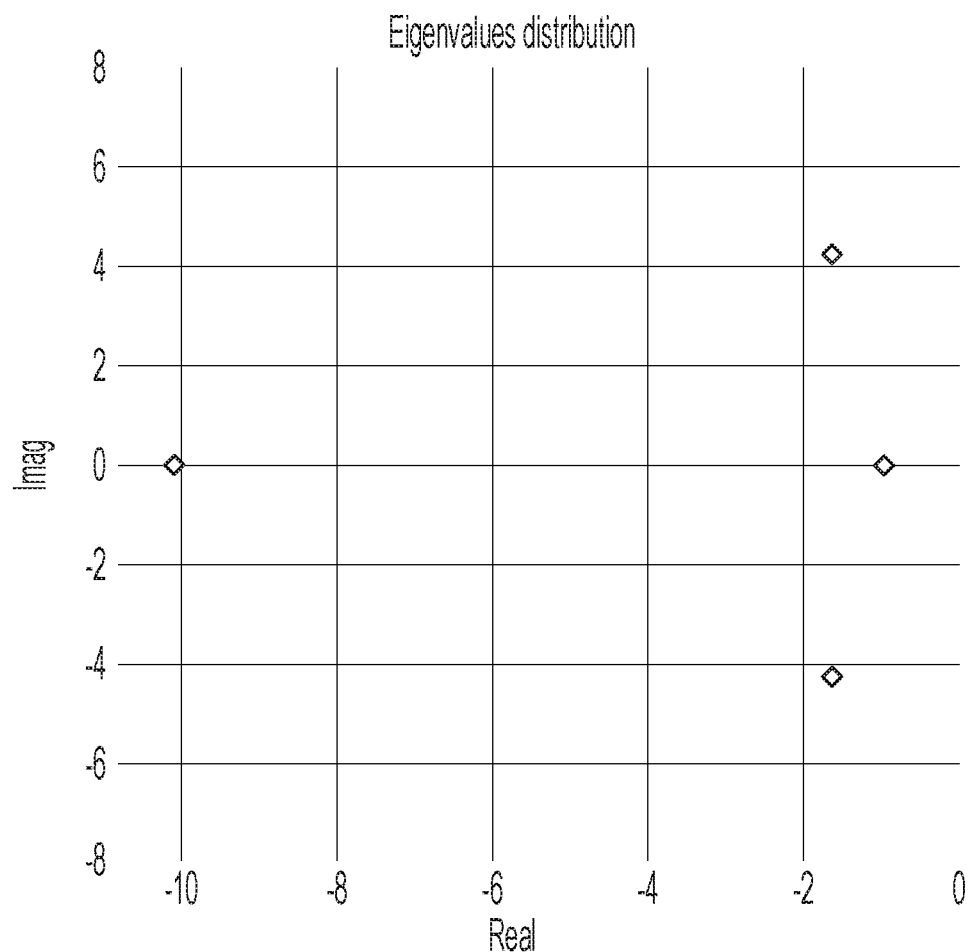
FIG. 4 is a graph of eigenvalues of the Jacobian of a closed loop system at equilibrium for the suboptimal stabilizing controller shown in FIGS. 3A and 3B.
Figure 5A:
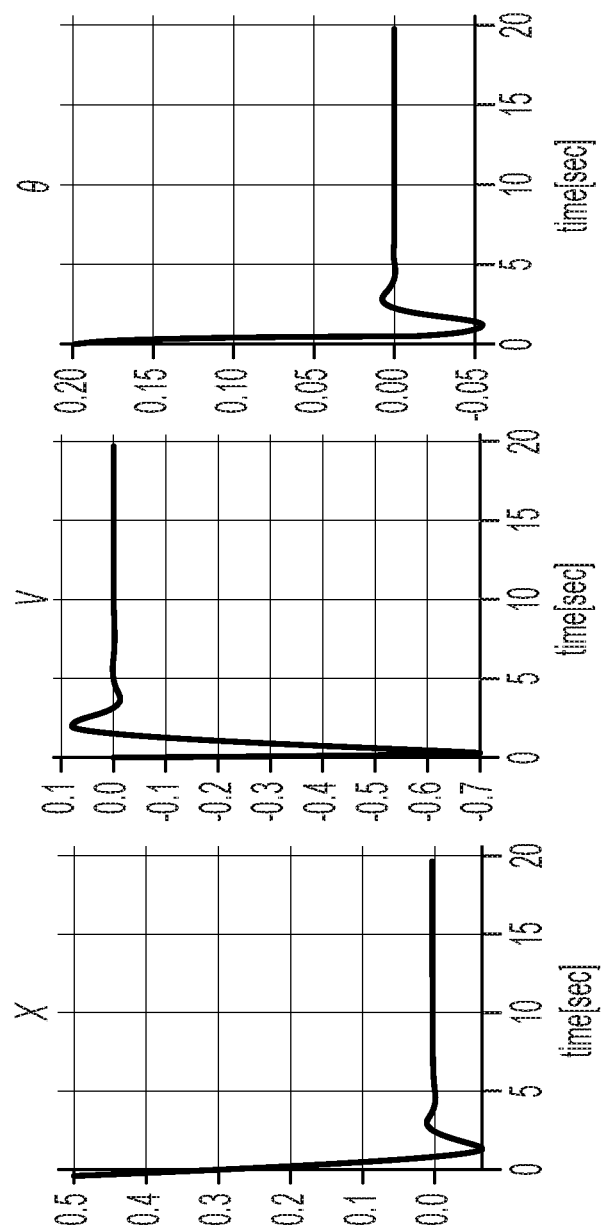
FIGS. 5A and 5B are graphs showing the behavior of an optimized controller according to an example embodiment.
Figure 5B:
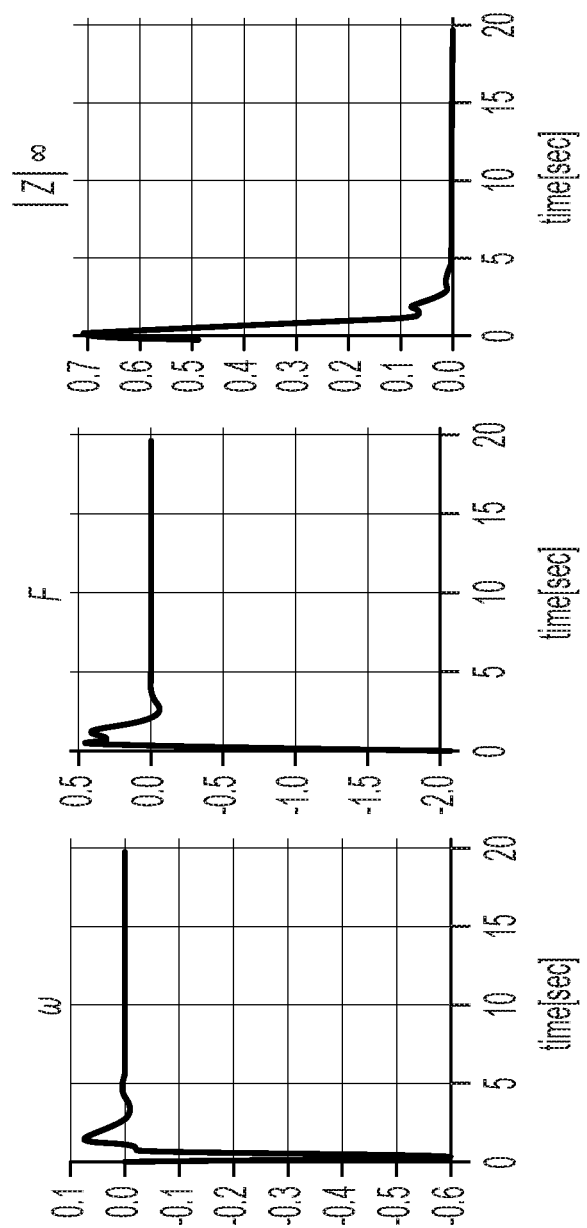
Figure 6:
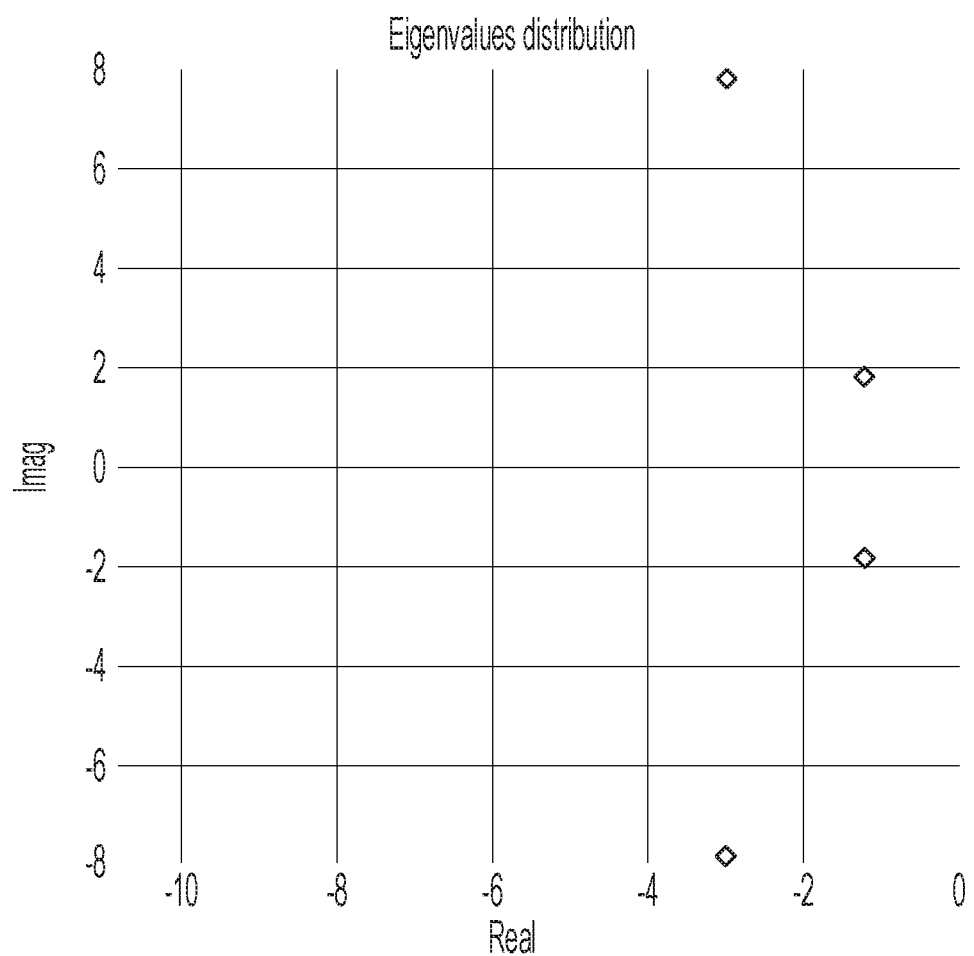
FIG. 6 is a graph of eigenvalues of the Jacobian of a closed loop system at equilibrium for the optimized controller shown in FIGS. 5A and 5B.
Figure 7A:
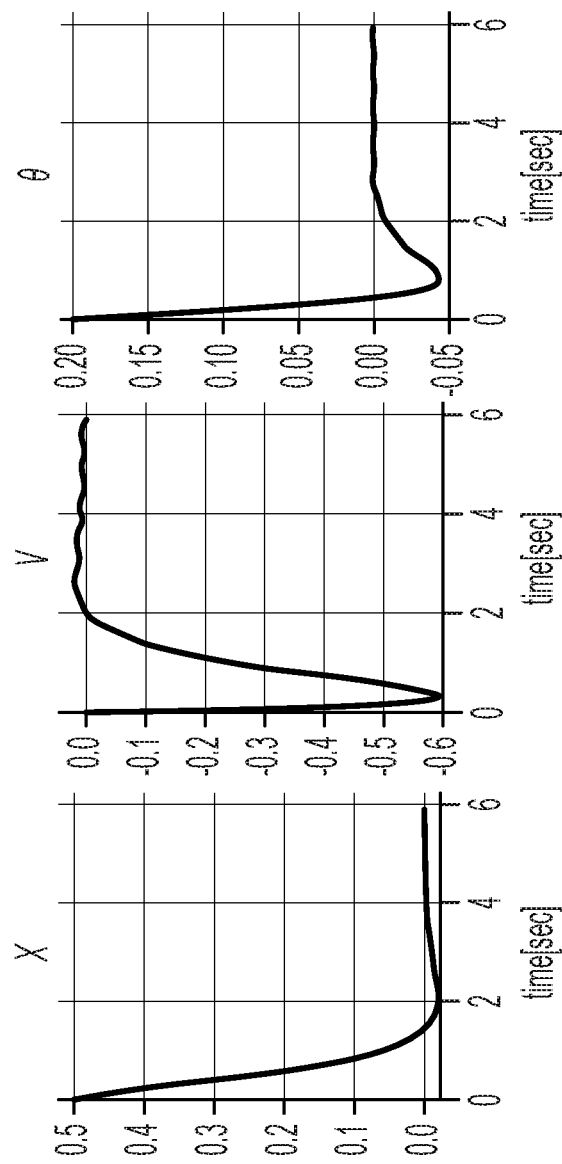
FIGS. 7A, 7B, 8A, and 8B are graphs showing the behavior of a model predictive control controller using different initial conditions according to an example embodiment.
Figure 7B:
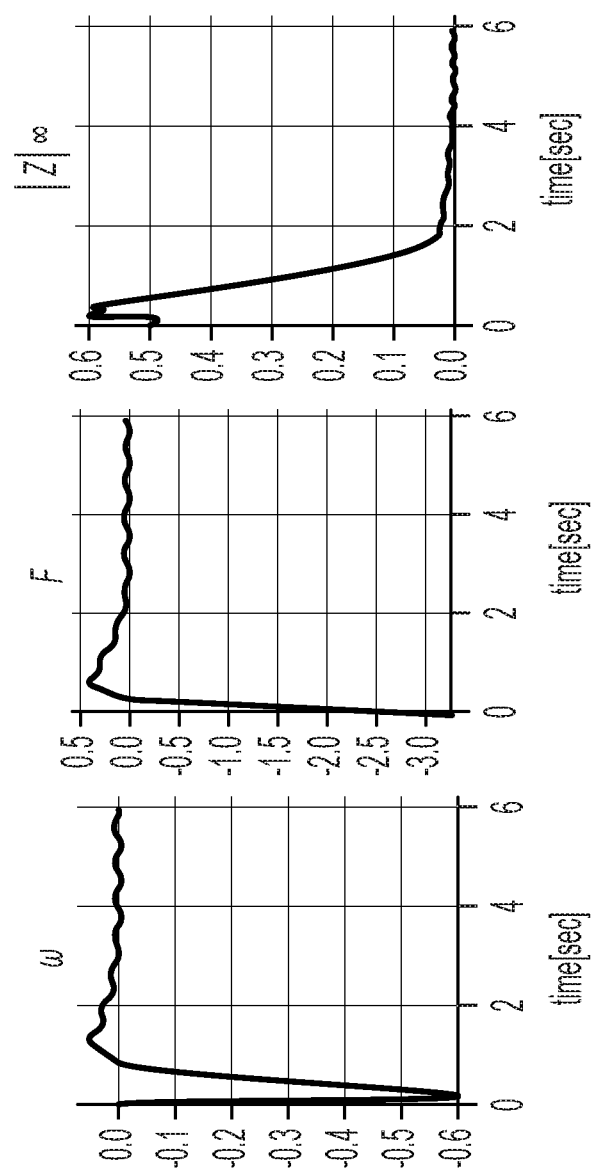
Figure 8A:
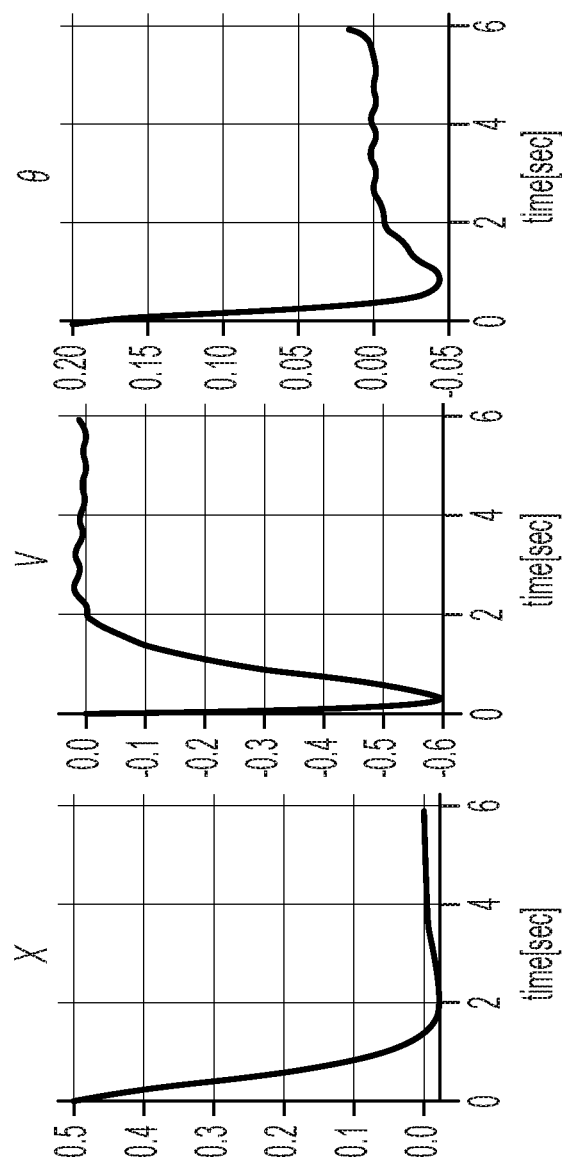
Figure 8B:
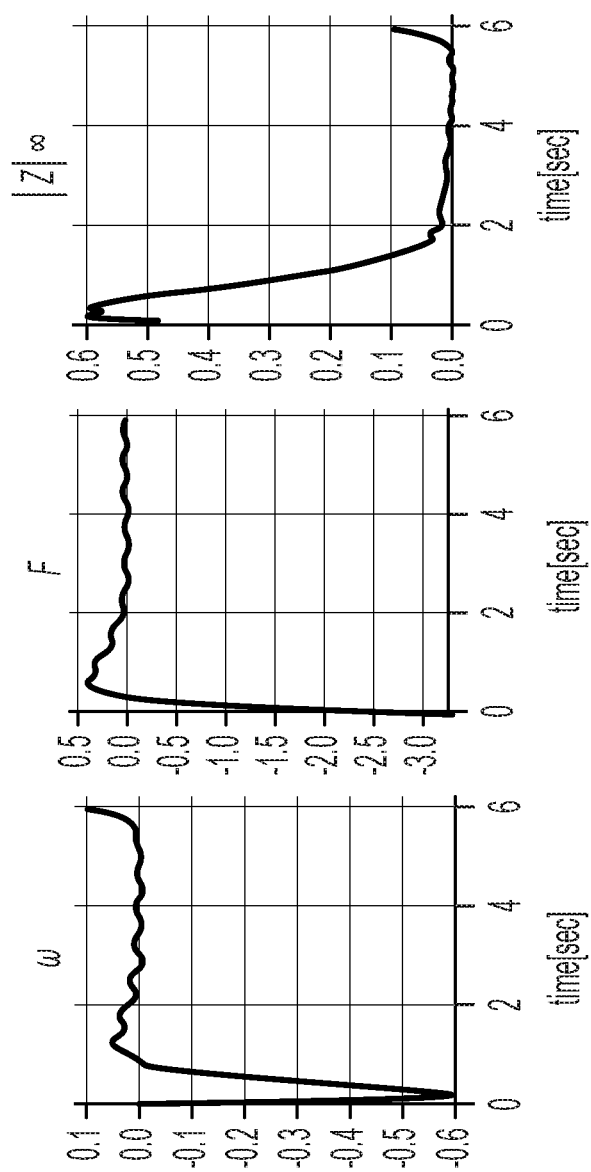

In FIGS. 3A and 3B, graphs show the behavior of the state vector for 20 seconds under the suboptimal stabilizing controller learned using Algorithm 1, where the initial conditions are x$_0$=0.5, v$_0$=0, θ$_0$=0.2 and ω$_0$=0. It can be seen that the eigenvalues of $$\frac{\partial f(0;\beta)}{\partial z}$$

are complex, with negative real parts. In FIG. 4, a graph shows the eigenvalues of the Jacobian $$\frac{\partial f(0;\beta)}{\partial z},$$

where $f(z;\beta)=f(z,\psi(z;\beta))$. The controller map learned using Algorithm 1 was used as the initial value for learning the control map parameters that minimize a quadratic loss function of the form $$\frac{1}{N}\sum_{i=0}^{N} q\|z(t_i)\|^2 + r\|u(t_i)\|^2,$$

where u(t)=ψ(z;β) and has the same structure as the controller learned using Algorithm 1. We executed 100 iteration of the Adams gradient-based algorithm, minimizing the quadratic loss function for q=1 and r=2, with a step size α=0.001. The results are shown in FIGS. 5A and 5B. The distribution of the eigenvalues of $$\frac{\partial f(0;\beta)}{\partial z}$$

for the updated control parameters is shown in FIG. 6.

B. Learning Finite Horizon Optimal Control Inputs

Model predictive control (MPC) is a modern control approach that generates control inputs that optimize the present while considering the future as well. It is an effective approach to fight model uncertainties and external disturbances, but it has a high computational cost. At each time instance a finite horizon, optimal control problem must be solved. The feasibility of the MPC approach to feedback control depends on the size of the problem (e.g., the number of optimization variables), the number of constraints, the computational power of the platform implementing the MPC method, and the system time constants. One of the factors that affects how fast we converge to a (local) minima is the initial value of the optimization algorithms. Automatic differentiation can again be used to compute the gradient and the Hessian matrix (if needed) of the loss function.

We tested the effect of a "good" initial condition on the optimization algorithm solving one step of the MPC approach. We used the same loss function as in the previous section. However, here the control policy is no longer explicitly parameterized as a function of the state—the control inputs themselves are the optimization variables. Due to its ability to accommodate constraints, we use the Sequential Least Squares Quadratic Programming (SLSQP) optimization algorithm. This time we constrained the control input (e.g., ‖u$^2$‖≤9), and we used Autograd to compute the loss function gradients provided to the SLSQP algorithm. When training DL models, bound constraints are typically imposed through clipping. Here, they are explicitly considered.

We tested the optimization algorithm under three scenarios: (a) initial control inputs generated using Algorithm I, (b) random initial conditions (u∈[−2; 2]), and (c) zero initial conditions. The optimization algorithm statistics (optimal value, number of iterations and number of function evaluations) for one finite horizon problem are shown in Table II.

TABLE II

Results of the SLSQP algorithm under different initialization scenarios

| Scenario | Optimal Value | Iterations | Function eval. |
|---|---|---|---|
| Stabilizing initial conditions | 0.1739 | 143 | 168 |

TABLE II-continued

Results of the SLSQP algorithm under different initialization scenarios

| Scenario | Optimal Value | Iterations | Function eval. |
|---|---|---|---|
| Random initial conditions | 0.1737 | 296 | 316 |
| Zero initial conditions | 0.1744 | 292 | 316 |

It is clear that using a stabilizing initial control decreases the convergence time. In MPC, a sequence of such problems are solved. It may be tempting to use the solution of the previous step as initial condition for the next MPC step. If the time horizon is not long enough, we typically cannot guarantee that the control input stabilizes the feedback loop.

close to zero and remain there after some time $T_{ss}$. As such, the loss function is now given by $\mathcal{L}(\beta; T) = \sum_{i=1}^{N} \mathcal{L}_i(\beta; z_0^{[i]})$, where $\mathcal{L}_i(\beta; z_0^{[i]}) = \sum_{j, T_{ss} \leq t_j \leq T} \|z(t_j)\|^2$, and index i refers to a particular initial state.

To avoid the blow-up of gradients during the learning process, we use an iterative approach where we solve a sequence of optimization problems. Each such optimization problem is solved for a time horizon chosen from the set $\mathcal{T} = \{T_l\}$ with $T_{l+1} > T_l$. For time horizons $T_l < T_{ss}$, the loss function is defined as $\mathcal{L}_i(\beta; z_0^{[i]}) = \|z(T_l)\|^2$, which basically encourages the state vector at the end of the horizon to get closer to zero. In addition to the loss function, we add a regularization function that ensures stabilization happens at the zero equilibrium point. In particular, regularization function takes the form $\|f(0; \beta)\|^2$. The sequential learning method is summarized in Algorithm 2.

---

Algorithm 2: Algorithm for learning stabilizing initial control parameters based on increasing time horizons 1: Input data: time horizon set $\mathcal{T} = \{T_0, T_1, \ldots, T_L\}$, initial values for the controller parameters $\beta$, set of initial conditions, regularization weight $\mu$ $\{z_0^{[0]}, \ldots, z_0^{[N]}\}$
2: for $T \in \mathcal{T}$ do
3:      $\beta \leftarrow \arg\min_\beta \mathcal{L}(\beta; T) + \mu \|f(0; \beta)\|^2$
4: Return $\beta$

---

As a consequence, the learning algorithm itself can become unstable leading to learning failure. To reinforce this idea, FIGS. 7A, 7B, 8A and 8B show the behavior of the inverted pendulum when using control inputs computed by minimizing $$\frac{1}{N} \sum_{i=0}^{N} q\|z(t_i)\|^2 + r\|u(t_i)\|^2 (r = 1, q = 2)$$

over a 6 sec time horizon. It is clear from FIG. 8 that the control input computed using zero initial condition is not stabilizing the pendulum. The time horizon can be increased to make sure the optimal control is stabilizing. This can have a damaging effect on the learning process though: if the initial control is not stable, gradients tend to explode, leading again to learning failure.

Having a better control of the parameters of the algorithm, the learning process was repeated using Adams algorithm. We empirically noticed that long time horizons tend to induce gradient explosions. This phenomenon can be explained as follows: during the search process, control inputs are generated that do not stabilize the system. As a result, for longer time horizons the instability is amplified. Consequently, the loss function gradients become unstable as well. We can control the gradient explosion to some extent by decreasing the learning rate, but we pay a price in terms of convergence speed.

C. Iterative Learning Based Approach

Figure 9:
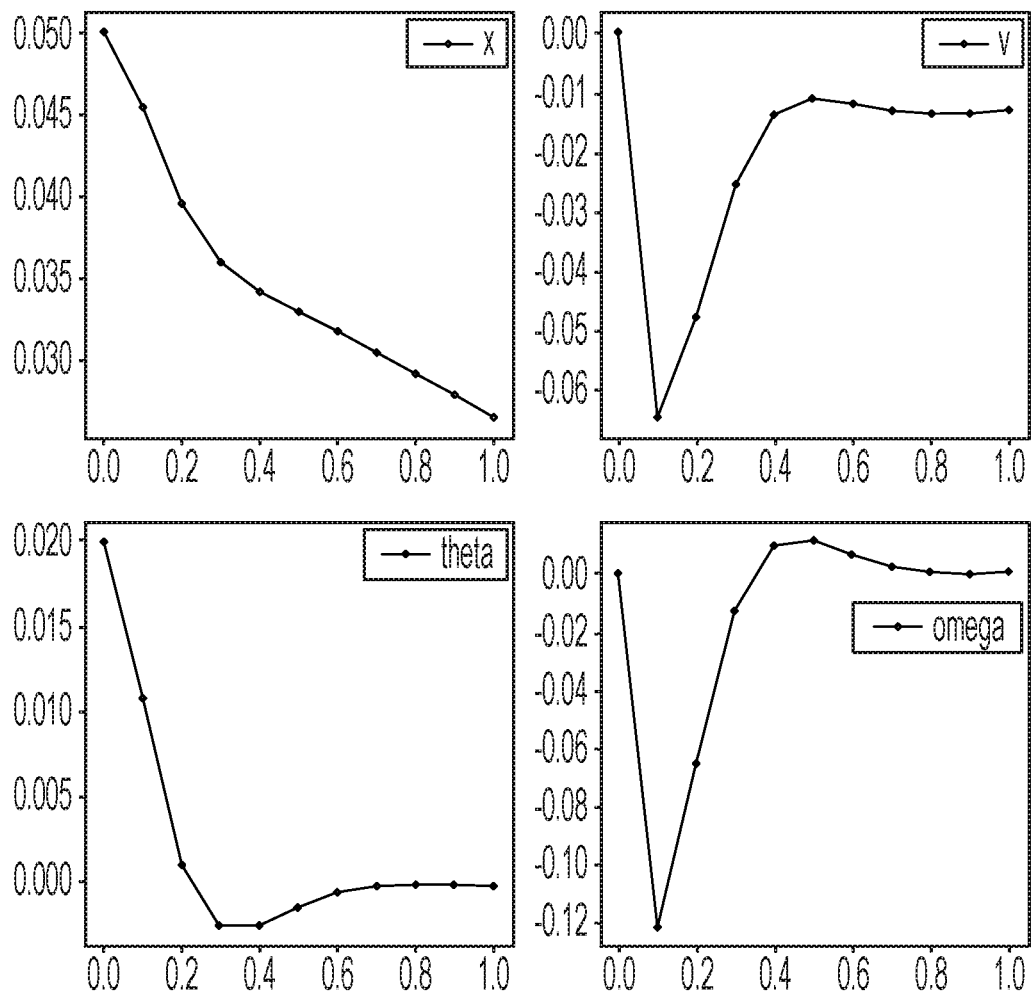
FIGS. 9 and 10 are sets of graphs showing the behavior of an iterative learning controller using different time horizons according to an example embodiment.
Figure 10:
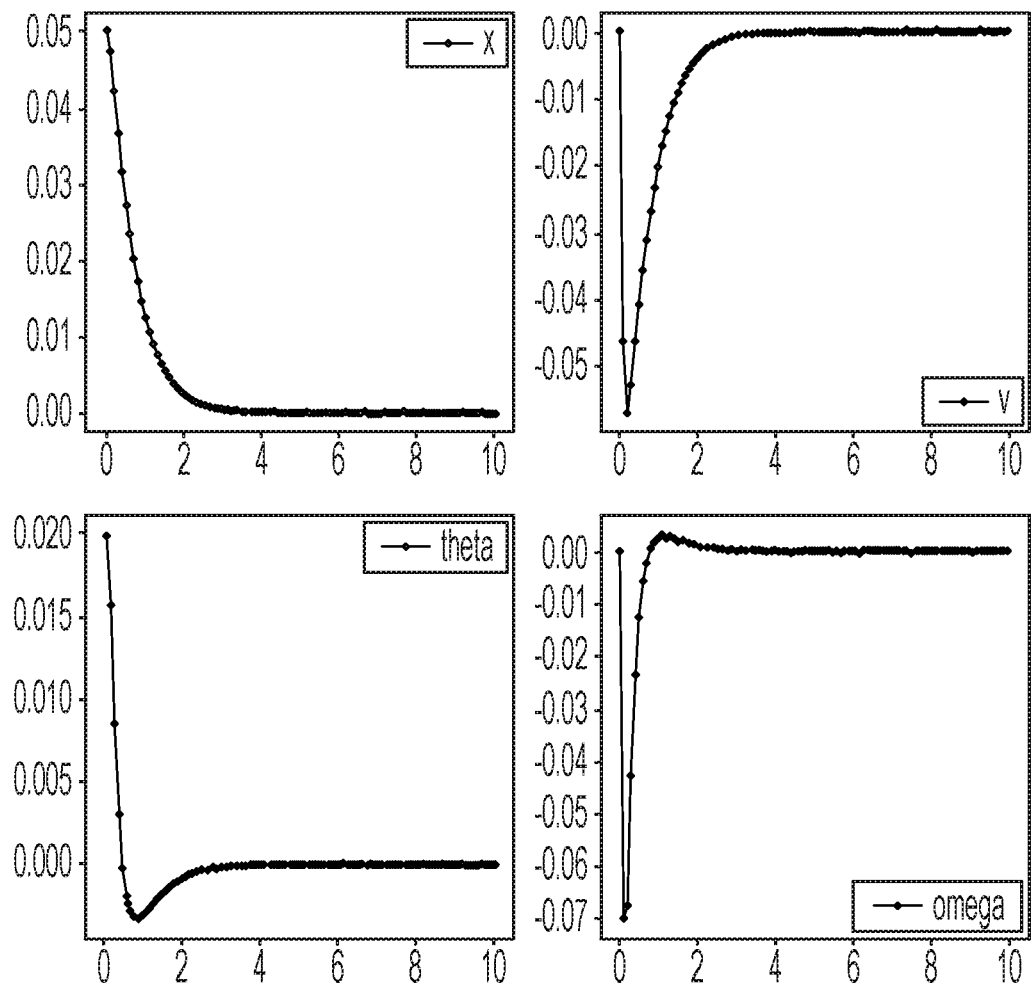

We emphasized in the previous section that longer time horizon and unstable initial control inputs can lead to learning failure. Here we explore a "small steps" approach, where we solve a sequence of optimal control problems, where in the beginning we use small time horizons that are gradually increased. This approach does not require first computing a stabilizing control policy. We use a parameterized, state dependent control map $u = \psi(z; \beta)$—the objective is to learn the parameters of the map such that a quadratic loss function is minimized. We consider a set on initial states and our objective is to "encourage" the state vector to be The graphs in FIGS. 9 and 10 show the learning results for two time horizons: 1 sec and 10 sec, respectively. The time at which we would like the system to be in steady state was chosen as $T_{ss} = 4$ sec. We chose 50 initial conditions with positions and angles selected randomly from the intervals [−1, 1] and [−0.5, 0.5] respectively. We used Autograd and Adams optimization algorithm to solve the optimization problems. The sequence of time horizons used was T={0.4, 0.6, 0.8, 1, 1.4, 2, 5, 6, 10} sec. The intuition behind the reason such an approach works is that short time horizons control gradient magnitudes even for unstable feedback loops. In addition, starting from a pre-trained control policy at the previous time horizon, ensures faster convergence times since for small differences in two consecutive time horizons, the differences in the control policies (as defined by the controller parameters) are not significant.

V. ADDITIONAL EXAMPLES

In this section, the concepts described above are used to derive control policies for unmanned aerial vehicles (e.g., drones). Specifically, the control policy is for a quadrotor (also referred to as a quadcopter) recovering when affected by motor failures. We train the control algorithm using deep learning methods. We map between the system state and the control input. We focus on an unstable system that involves careful initialization of the learning algorithms and derive initialization procedures that ensure stable learning algorithms. We derive iterative algorithms that learn optimal control policies while incrementally increasing the time horizons.

Currently, large scale optimization is used to solve constrained optimization problem, where the cost is quadratic, and the constraints are linear. The algorithm uses convex optimization methods that do not require gradient computations. We use the deep learning platforms featuring automatic differentiation to accurately compute loss function of control objectives and a constraints function. The method applies to non-convex objective functions and nonlinear system.

The control algorithm is designed to prevent drone crashes when they lose at least one motor. The drone dynamics are unstable and deep learning training algorithms cannot be used as is for such systems. We overcome the stability challenges of the learning algorithm when dealing with unstable systems in this particular scenario. We design initialization strategies and iterative schemes to learn optimal control problems.

Figure 11:
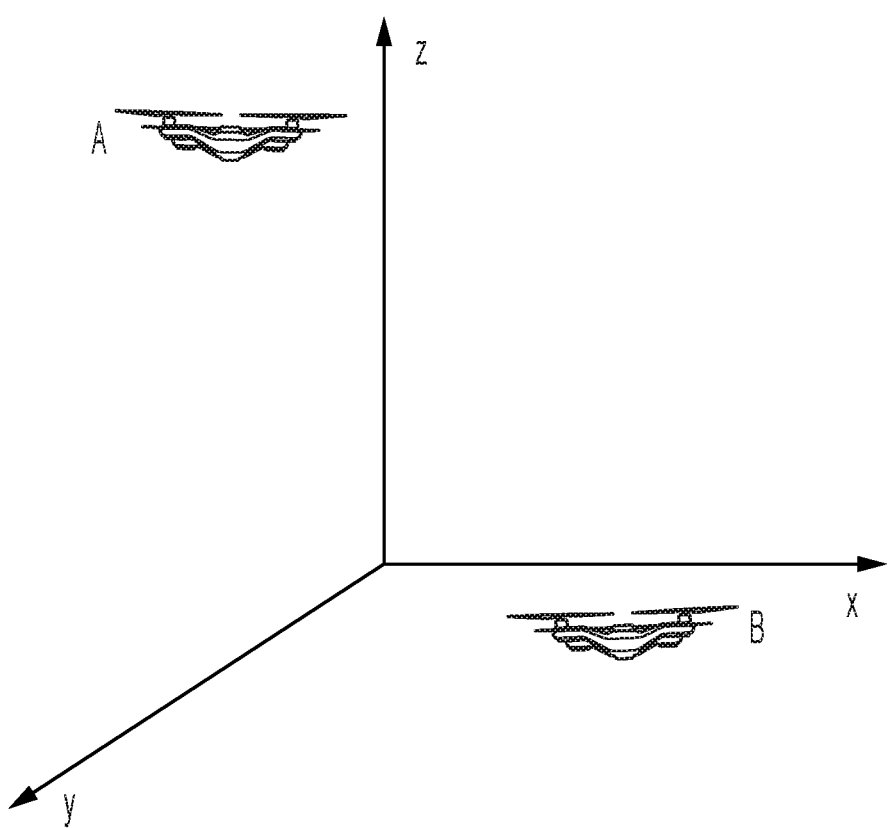
FIG. 11 is a diagram illustrating an unmanned aerial vehicle control scenario according to an example embodiment.

One objective is to safely recover (e.g., land) a drone when affected by a catastrophic failure such as loss of thrust due to motor failure. We assume the drone has four motors (quadrotor). The same approach would work for drone with more than four motors, although with different equations that describe the controller dynamics. We formulate the problem as a trajectory tracking problem, without full actuation capability. The diagram in FIG. 11 depicts the problem discussed in this section: safely navigate the drone from point A to point B.

The dynamics of the drone are described by a system of ordinary differential equations $\dot{X}=F(X, U)$, where $U=[U_1, U_2, U_3, U_4]$ is the vector of inputs for the drone control that are defined as function of the rotor angular velocity dependent lift forces:

$$U_1 = b(\Omega_2^2 + \Omega_3^2 + \Omega_4^2)$$

$$U_2 = b(-\Omega_2^2 + \Omega_4^2)$$

$$U_3 = b(-\Omega_3^2)$$

$$U_4 = d(\Omega_2^2 - \Omega_3^2 + \Omega_4^2)$$

The function $F(X, U)$ is defined as $$(X, U) = \begin{cases} \dot{\phi} \\ b_1 U_2 \\ \dot{\theta} \\ b_2 U_3 \\ \dot{\psi} \\ b_3 U_4 \\ \dot{z} \\ g - \dfrac{\cos\phi\cos\theta}{m} U_1 \\ \dot{x} \\ \dfrac{u_x}{m} U_1 \\ \dot{y} \\ \dfrac{u_y}{m} U_2 \end{cases}$$

In the case of a motor failure, the actuation capability is reduced. Assuming motor 1 failed, the input vector becomes:

$$U_1 = b(\Omega_2^2 + \Omega_3^2 + \Omega_4^2)$$

$$U_2 = b(-\Omega_2^2 + \Omega_4^2)$$

$$U_3 = b(-\Omega_3^2)$$

$$U_4 = d(\Omega_2^2 - \Omega_3^2 + \Omega_4^2)$$

Figure 12:
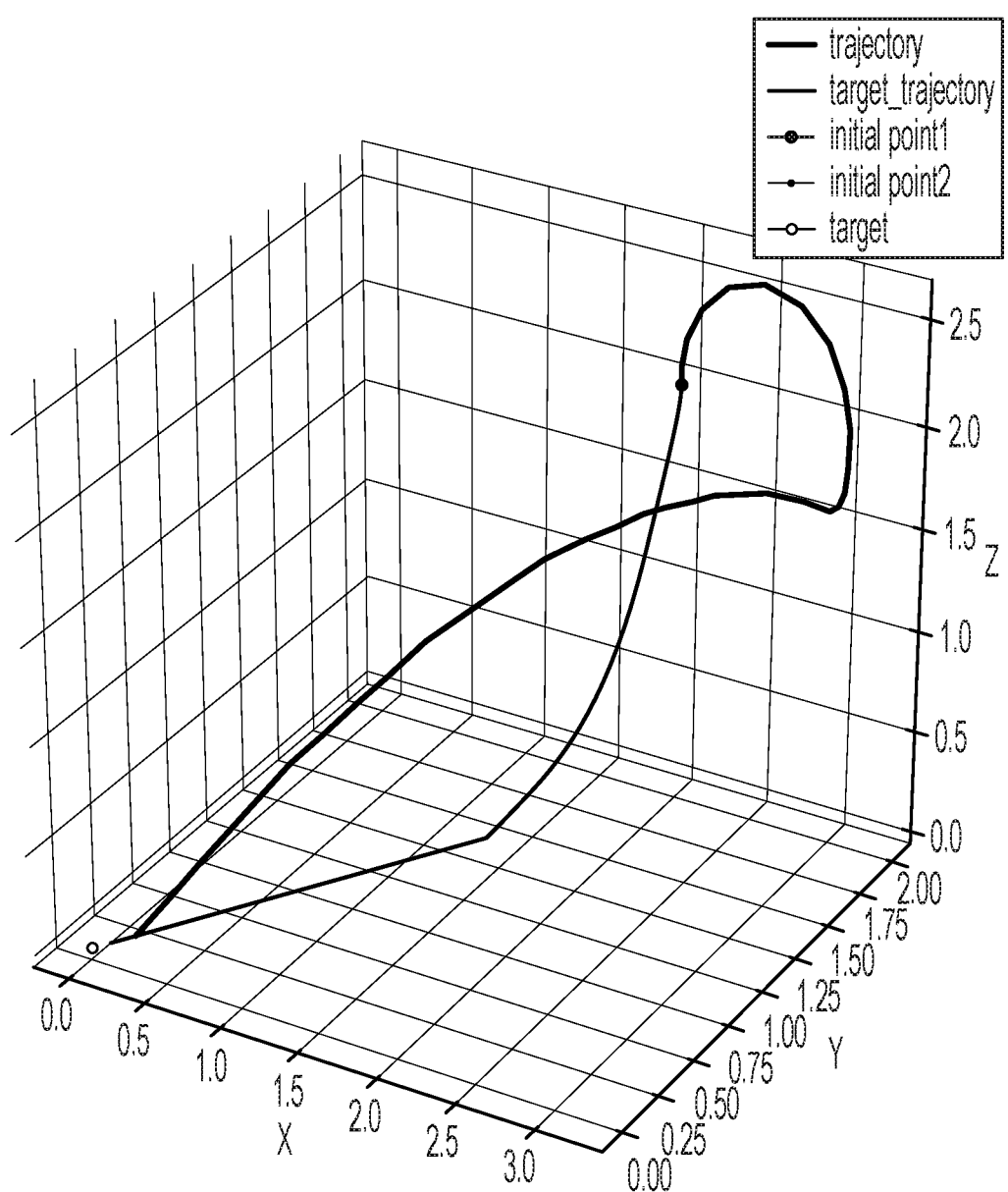
FIGS. 12 and 13 are graphs comparing landing trajectories and control inputs under nominal conditions and under motor failure conditions for an unmanned aerial vehicle controller according to an example embodiment.
Figure 13:
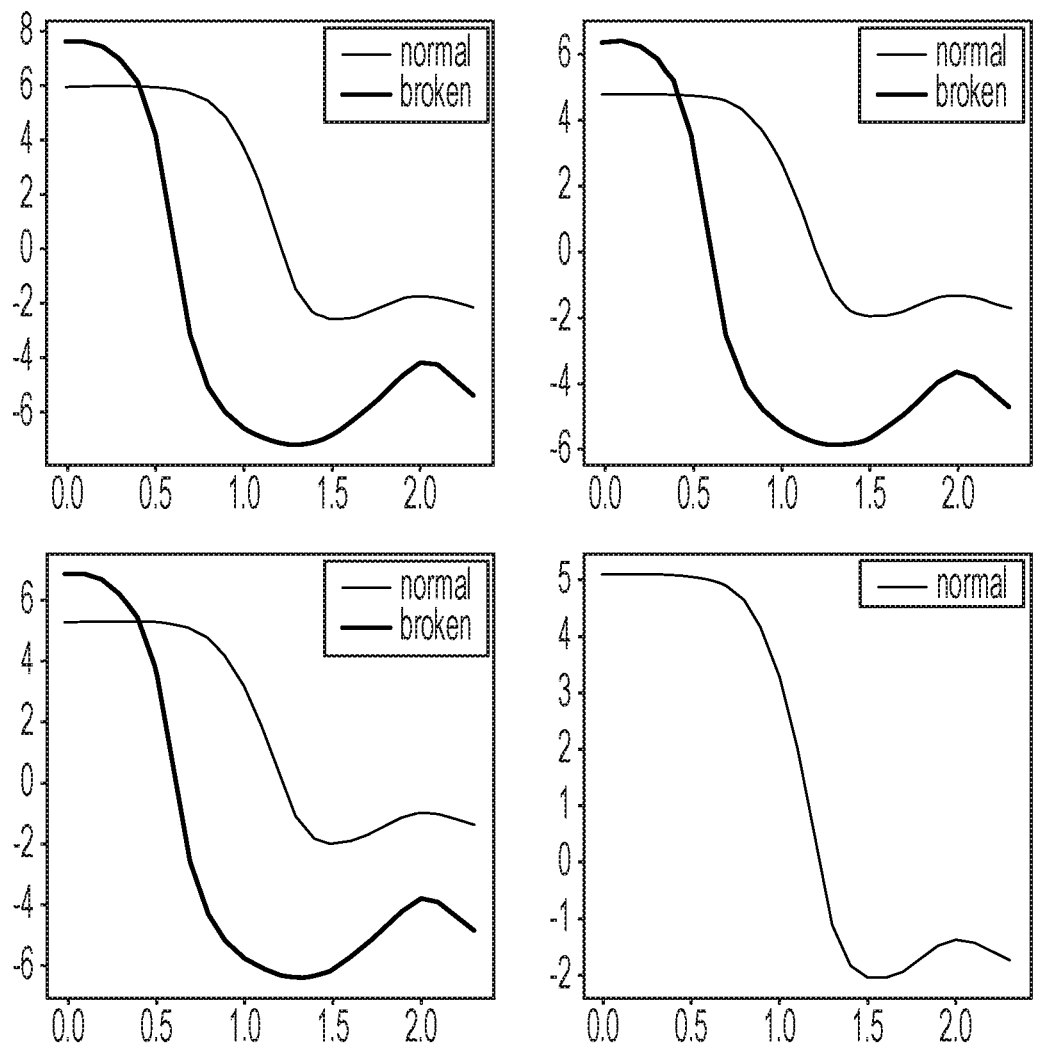

The solve the safe landing problem, we solve an optimization problem of the form $$\min_{\Omega_2^2, \Omega_3^2, \Omega_4^2} \int_{t_0}^{t_f} |z(t)|^2 dt$$

subject to: $z(t_f)=0, \dot{z}(t_f)=0$ which ensures that the drone decreases its speed as it approaches the landing position. Additional constraints functions on (x, y) position can be added as needed. We can solve this problem using a tool such as Pytorch that has the capability to use automatic differentiation, while also using an ODE solver to solve for the system dynamics. The diagram in FIG. 12 shows a comparison between the landing trajectories under nominal conditions (actuation based on all four motors) and under motor failure conditions (actuation based on 3 motors only). The graphs in FIG. 13 show a comparison between the control inputs under nominal conditions (actuation based on all four motors) and under motor failure conditions (actuation based on 3 motors only).

Figure 14:
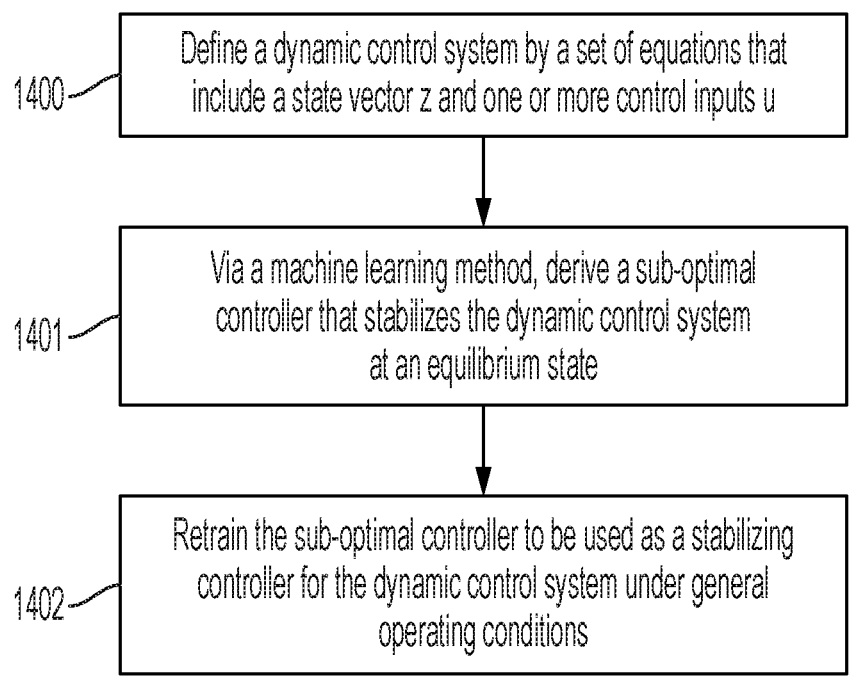
FIG. 14 is a flowchart showing a method according to an example embodiment.

The flowchart in FIG. 14 illustrates a method according to an example embodiment. The method involves defining 1400 a dynamic control system by a set of equations that include a state vector z and one or more control inputs u. Via a machine learning method (e.g., deep neural networks), a sub-optimal controller is derived 1401 that stabilizes the dynamic control system at an equilibrium state. The sub-optimal controller is retrained 1402 to be used as a stabilizing controller for the dynamic control system under general operating conditions, e.g., where the dynamic control system provides feedback-based control of a physical plant under real-world operating conditions.

Figure 15:
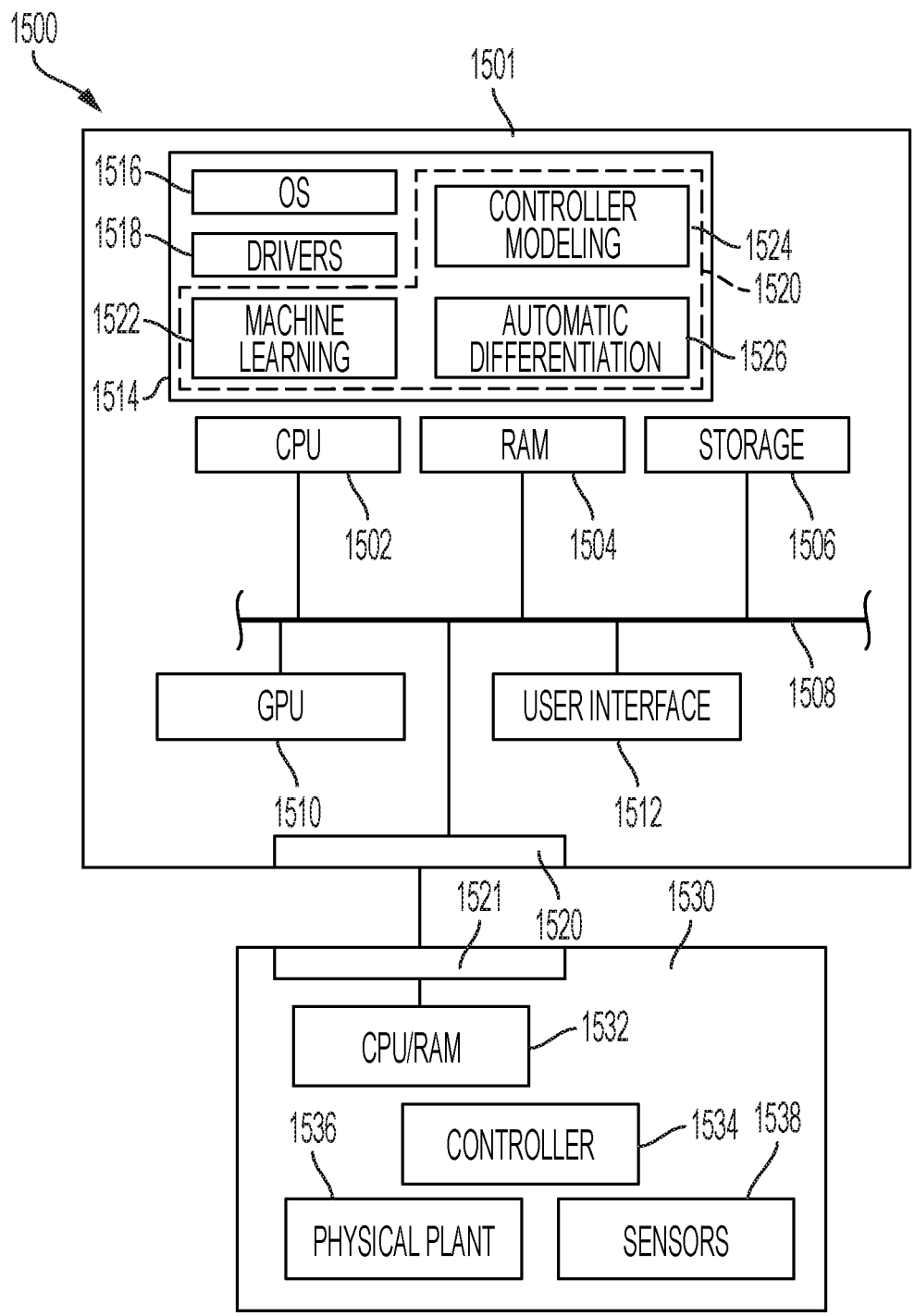
FIG. 15 is a block diagram of a system and apparatus according to an example embodiment.

In FIG. 15, a block diagram shows a system 1500 according to an example embodiment. The system 1500 includes a general purpose computer 1501, such as a workstation, server, cluster, etc. The computer includes conventional hardware such as a central processing unit (CPU) 1502, random access memory (RAM) 1504, non-volatile data storage 1506, input/output busses 1508, a graphics processing unit 1510, and user interface 1512. The CPU 1502 operates using instruction in software 1514, which at a low level includes operating systems (OS) 1516, drivers 1518, etc.

The software 1514 also includes application-specific programs such as machine learning libraries/programs 1522, controller modeling libraries/programs 1524, and automatic differentiations libraries/programs 1526. These software components are used to define a dynamic control system by a set of equations. The set of equations include a state vector z of a controlled apparatus 1530 and one or more control inputs u of the controlled apparatus 1530. Via a machine learning method, the computer 1501 is used to derive a sub-optimal controller that stabilizes the controlled apparatus 1530 at an equilibrium point. The computer 1501 then retrains the sub-optimal controller to be used as a stabilizing controller 1534 for the controlled apparatus under general operating conditions, e.g., in response to arbitrary input conditions and arbitrary disturbances encountered while the controlled apparatus 1530 is in operation.

The controlled apparatus 1530 includes its own computing hardware, as represented by CPU/RAM 1532. Other specific hardware may also be used in the apparatus 1530, such as digital-to-analog converters, analog-to-digital converters, digital signal processors, etc. The controller 1534 of the controlled apparatus may include a software component that can be changed, e.g., by having the stabilizing controller developed at the computer 1501 be transferred to the controlled apparatus 1530 via data interfaces 1520, 1521. These interfaces 1520, 1521 may use a direct wire or wireless connection, or may use some other media, such as a memory card, to affect data transfer between the devices 1501, 1530.

The controller 1534 is part of a closed loop control system that may include a physical plant 1536 and sensors 1538. In the case the controlled apparatus is a quadrotor vehicle, the physical plant 1536 will include the motors and motor control electronics, and the sensors may include accelerometers, compass, tilt angle detectors, geolocation sensor, etc. It will be understood that these generic control components 1534, 1536, 1538 are found in many different types of control systems, and a stabilizing controller found through deep machine learning may be used in many different types of these systems.

VI. CONCLUSION

We demonstrated that deep learning platforms can be used for training stabilizing controllers. We showed that for unstable systems, most often the training algorithm will fail since the system instability induces instability in the gradient descent algorithm. We demonstrated that starting with a stable initial controller, we are guaranteed the existence of gradient descent step sizes that ensure bounded gradients. We borrowed ideas from transfer learning in DL to develop three strategies to overcome learning instability. In the first approach, we learned an optimal nonlinear controller by using a sub-optimal stabilizing controller as the initial value. The sub-optimal control policy was learned by enforcing spectral properties of the system Jacobian around the equilibrium point. In the second approach, we used an MPC strategy and learned non-parameterized control inputs that minimize a quadratic cost, starting once again from a sub-optimal stabilizing controller. In the third approach, we applied a "small steps" strategy, where we solved a sequence of quadratic optimal control problems with increasing time horizons, preventing gradient explosion. For all three approaches, we used automatic differentiation for computing and evaluating Jacobians and loss function gradients.

Automatic differentiation is a useful tool for learning control policies. It can be directly applied on system models to generate linear approximations and compute local stabilizing controllers. First order gradient algorithms (e.g., Adams) applied to large scale problems, together with automatic differentiation that computes loss function gradients, enable control policy design for nonlinear system (although only local solutions can be guaranteed without addition assumptions, like convexity, on the loss function properties). Our experiments showed that offline design of control policies based on parameterized, state-dependent maps definitely benefits from the computational tools offered by DL platforms. This is due, in part, to the integration of ordinary differential equation (ODE)/differential-algebraic equation (DAE) solvers.

Further development may include assessing the feasibility of using DL platforms for real-time control design (e.g., MPC) in order to investigate the stability of the learning algorithms and the practical challenges of transferring learning models to physical platforms that implement the control policies.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

The invention claimed is:

1. A method of controlling an unmanned aerial vehicle, comprising:
    defining a nonlinear dynamic control system by a set of equations that include a state vector z and one or more control inputs, the nonlinear dynamic control system comprising a physical plant of the unmanned aerial vehicle, the physical plant comprising three motors and at least one other motor that all provide thrust for the unmanned aerial vehicle;
    via a machine learning method, deriving a sub-optimal controller that stabilizes the nonlinear dynamic control system at an equilibrium point, the machine learning method optimizing controller parameters by manipulating spectral properties of a Jacobian of the state vector at the equilibrium point; and
    retraining the sub-optimal controller to be a stabilizing controller for the nonlinear dynamic control system under operating conditions of the physical plant; and
    using the stabilizing controller to provide closed loop control of the three motors when the unmanned aerial vehicle is affected by the at least one other motor losing thrust.

2. The method of claim 1, wherein deriving the sub-optimal controller comprises determining a stabilizing controller for a linear approximation of the nonlinear dynamic control system around the equilibrium point.

3. The method of claim 1, wherein a time rate of change 2 of the state vector z is a function $f(z;\beta)$ wherein $\beta$ is a set of parameters of the sub-optimal controller, and wherein deriving the sub-optimal controller comprises manipulating spectral properties of a Jacobian map $$A(\beta) = \frac{\partial f(0;\beta)}{\partial z}$$

at the equilibrium point.

4. The method of claim 3, wherein:
    the Jacobian map $A(\beta)$ is generated using auto-differentiation;

a discrete time version $A_d(\beta)$ of $A(\beta)$ is computed using a Taylor series expansion; and $\beta$ is found by solving an optimization problem $\min_\beta\{0, \|A_d(\beta)^k\|-\lambda^k\}$, wherein $k\geq 1$ and $\lambda$ is a positive, real scalar having a value less than one.

5. The method of claim 1, wherein retraining the sub-optimal controller comprises learning a parameterized map for the stabilizing controller that minimizes a quadratic loss function.

6. The method of claim 1, wherein retraining the sub-optimal controller comprises using a model predictive control (MPC) approach in which non-parameterized control inputs of the sub-optimal controller are used as initial conditions to solve a finite horizon optimal control problem that explicitly generates optimal control inputs.

7. The method of claim 6, wherein automatic differentiation is used to compute a gradient of a loss function used to solve the finite horizon optimal control problem.

8. The method of claim 6, wherein automatic differentiation is used to compute a Hessian matrix of a loss function used to solve the finite horizon optimal control problem.

9. The method of claim 1, wherein retraining the sub-optimal controller comprises learning a parameterized, state-dependent control map by solving a sequence of finite horizon optimal control problems.

10. The method of claim 1, wherein retraining the sub-optimal controller comprises using automatic differentiation to determine a time rate of change ż of the state vector z.

11. The method of claim 1, wherein retraining the sub-optimal controller comprises using automatic differentiation to determine a control objective and a constraints function.

12. The method of claim 1, wherein the stabilizing controller is used for a safe recovery of the unmanned aerial vehicle under loss of thrust of the at least one other motor.

13. A non-transitory computer-readable medium storing instructions operable by a processor to perform the method of claim 1.

14. A method of controlling an unmanned aerial vehicle, comprising:

defining a nonlinear dynamic control system by a set of equations that include a state vector z and one or more control inputs u, the nonlinear dynamic control system comprising a physical plant of the unmanned aerial vehicle, the physical plant comprising three motors and at least one other motor that all provide thrust for the unmanned aerial vehicle;

via a machine learning method, deriving a sub-optimal controller that stabilizes the nonlinear dynamic control system at an equilibrium point; and retraining the sub-optimal controller to be a stabilizing controller for the nonlinear dynamic control system under operating conditions of the physical plant, wherein retraining the sub-optimal controller comprises a model predictive control (MPC) approach in which a parameterized, state-dependent control map is learned by solving a sequence of finite horizon optimal control problems; and using the stabilizing controller to provide closed loop control of the three motors when the unmanned aerial vehicle is affected by the at least one other motor losing thrust.

15. The method of claim 14, wherein retraining the sub-optimal controller further comprises using automatic differentiation for a time rate of change ż of the state vector z.

16. The method of claim 14, wherein automatic differentiation is used to compute at least one of gradient and a Hessian matrix of a loss function used to solve the finite horizon optimal control problem.

17. A system comprising:

an unmanned aerial vehicle comprising a physical plant, the physical plant comprising three motors and at least one other motor that all provide thrust for the unmanned aerial vehicle; and a computer comprising a memory coupled to a processor, the memory comprising instructions that cause the processor to:

define a non-linear dynamic control system by a set of equations that include a state vector z of the unmanned aerial vehicle and one or more control inputs u to the physical plant of the unmanned aerial vehicle;

via a machine learning method, derive a sub-optimal controller that stabilizes the unmanned aerial vehicle at an equilibrium point, the machine learning method optimizing controller parameters by manipulating spectral properties of a Jacobian of the state vector at the equilibrium point; and retrain the sub-optimal controller to be a stabilizing controller for the unmanned aerial vehicle under operating conditions of the physical plant of the unmanned aerial vehicle, wherein the stabilizing controller is transferred to the unmanned aerial vehicle, the stabilizing controller used by the unmanned aerial vehicle to provide closed loop control of the three motors when the unmanned aerial vehicle is affected by the at least one other motor losing thrust.

18. The system of claim 17, wherein the stabilizing controller is used for a safe recovery of the unmanned aerial vehicle under loss of thrust of the at least one other motor.

* * * * *